(12) United States Patent
Kawamata

(10) Patent No.: US 6,273,074 B1
(45) Date of Patent: Aug. 14, 2001

(54) CRANKCASE EMISSION CONTROL SYSTEM

(75) Inventor: Noriyuki Kawamata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,327

(22) Filed: Sep. 5, 2000

(30) Foreign Application Priority Data

Sep. 5, 1999 (JP) .................................................. 11-291426

(51) Int. Cl.$^7$ .................................................... F02M 25/06
(52) U.S. Cl. ............................................................. 123/572
(58) Field of Search ................................... 123/572, 573, 123/574

(56) References Cited

U.S. PATENT DOCUMENTS

| | | | | |
|---|---|---|---|---|
| 4,269,607 | * | 5/1981 | Walker | 123/573 |
| 5,499,616 | * | 3/1996 | Enright | 123/572 |
| 5,697,349 | * | 12/1997 | Blum | 123/572 |
| 5,992,397 | * | 11/1999 | Hideaki et al. | 123/573 |

FOREIGN PATENT DOCUMENTS

| | | |
|---|---|---|
| 10-212923 | 8/1998 | (JP) . |
| 1136841 | 2/1999 | (JP) . |
| 1150831 | 2/1999 | (JP) . |

\* cited by examiner

*Primary Examiner*—Marguerite McMahon
(74) *Attorney, Agent, or Firm*—Birch, Stewart, Kolasch & Birch, LLP

(57) ABSTRACT

A catch tank for gas-liquid separation is arranged on a side surface of a connecting tube and directly connected to the connecting tube by a joint pipe provided on a right side surface facing the connecting tube in order to simply attach the catch tank and to prevent leakage of a liquid component of blow-by gas into an air cleaner even when a vehicle body is operated in a tilted position. An introduction pipe is formed protruding to the front of a vehicle at a bottom section of the catch tank and a corner section of the joint pipe. One end of a blow-by gas introduction tube is attached at the corner section and the other end of the introduction tube is connected to a breather chamber of a crankcase. The joint pipe is provided only a dimension h above the introduction pipe and only a dimension d in front of a rear wall, wherein h and d are arranged to prevent a liquid component flowing from the joint pipe to the connecting tube side either when the vehicle is stood upright or is tilted on its left side.

16 Claims, 11 Drawing Sheets

CRANKCASE EMISSION CONTROL SYSTEM

BACKGROUND OF THE INVENTION

1. Field of the Invention

The present invention relates to a crankcase emission control system for use in an engine of an off-road vehicle. The present invention is especially suited for use in applications that can benefit from a crankcase emission control system that is easily attached, offers simple construction, and functions sufficiently even when the vehicle is operated when tilted in a horizontal or vertical direction.

2. Background Art

There are several conventional types of crankcase emission control systems. One crankcase emission control system utilizes an air cleaner and a reduction chamber that is heated by the hot exhaust gases passing through the muffler. This type of system is shown in Japanese Patent Laid-open No. Hei. 11-036841. A second type of crankcase emission control system is shown in Japanese Patent Laid-open No. Hei. 10-212923, where lubrication oil is returned to the engine case via a breather hose arranged in an elevated position above a crankcase. A third type of crankcase emission control system is shown in Japanese Patent Laid-open No. Hei. 11-50831. This system includes a gas-liquid separation chamber provided with an oil removing means to separate crankcase lubricant from gas emissions.

However, with each of the above-described conventional examples, reduction is carried out in combination with an air cleaner. This can have a considerable effect on the intake air amount of the air cleaner. In addition, since special components are required for attachment of the conventional devices, the overall number of components is increased. Finally, if the posture of a vehicle changes severely, such as when the vehicle is being driven off-road, a liquid component of the blow-by gas is likely to flow directly to an air cleaner side of these systems. Similarly, when a 4-wheeled buggy is stored in an upright position, a liquid component inside the gas-liquid separation chamber is also likely to flow to the air cleaner side of these systems.

SUMMARY OF THE INVENTION

The present invention overcomes the shortcomings associated with the prior art and achieves other advantages not realized by the prior art.

An object of the present invention is to provide a crankcase emission control system that is capable of preventing a liquid component of a blow-by gas from a crankcase from flowing back into the intake passageway of the system.

A further object of the present invention is to reduce and/or eliminate any liquid from flowing back into the intake passageway of the system even under severe tilting or leaning of a vehicle.

A further object of the present invention is to reduce and/or eliminate additional components and fastening means required in the systems of the conventional art.

These and other objects are accomplished by a crankcase emission control system for a vehicle comprising a blow-by gas extraction port for a crankcase; a connecting tube for connecting a carburetor and an air cleaner; a communicating opening connecting a shaft hole surrounding said crankcase with a curved communicating passage; a horizontal communicating passage for a breather chamber, wherein said curved communicating passage is connected to said horizontal communicating passage in order to deliver crankcase blow-by gas to the breather chamber; a breather chamber joint pipe connected through an introduction tube; a catch tank, the introduction tube provided for leading blow-by gas occurring inside the crankcase to the catch tank and the catch tank has at least an inside surface, an outside surface, a right side surface, a left side surface, a top surface, a bottom surface, a front side surface, and a rear side surface, wherein blow-by gas is expanded in the catch tank to effect gas-liquid separation and liquid accumulates along the inside and bottom surfaces of the tank; an introduction pipe formed at a corner portion of the catch tank where the bottom surface, front side surface, and either of the right or left side surfaces meet, wherein the introduction pipe is connected to said introduction tube; a catch tank joint pipe for connecting the catch tank to the connecting tube, wherein the joint pipe is positioned along either the right or left side surfaces of said catch tank for providing liquid-free communication of gases to the connecting tube; wherein the catch tank joint pipe is provided at a position in front of the rear side surface of said tank that is defined by a distance dimension d, wherein h and d are arranged to prevent a liquid component flowing from the catch tank joint pipe to the connecting tube during operation in upright and tilted positions.

These and other objects are also accomplished by a crankcase emission control system for a vehicle comprising a carburetor; an air cleaner; a connecting tube; a catch tank, wherein the catch tank has at least an inside surface, an outside surface, a right side surface, a left side surface, a top surface, a bottom surface, a front side surface, and a rear side surface, wherein blow-by gas is expanded in the catch tank to effect gas-liquid separation; an introduction pipe formed at a corner portion of the catch tank where the bottom surface, front side surface, and either of the right or left side surfaces of the catch tank adjoin; and a catch tank joint pipe formed along either the right or left side surface of the catch tank for connecting the catch tank to the connecting tube, wherein the catch tank joint pipe is positioned for providing liquid-free communication of gases to the connecting tube.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
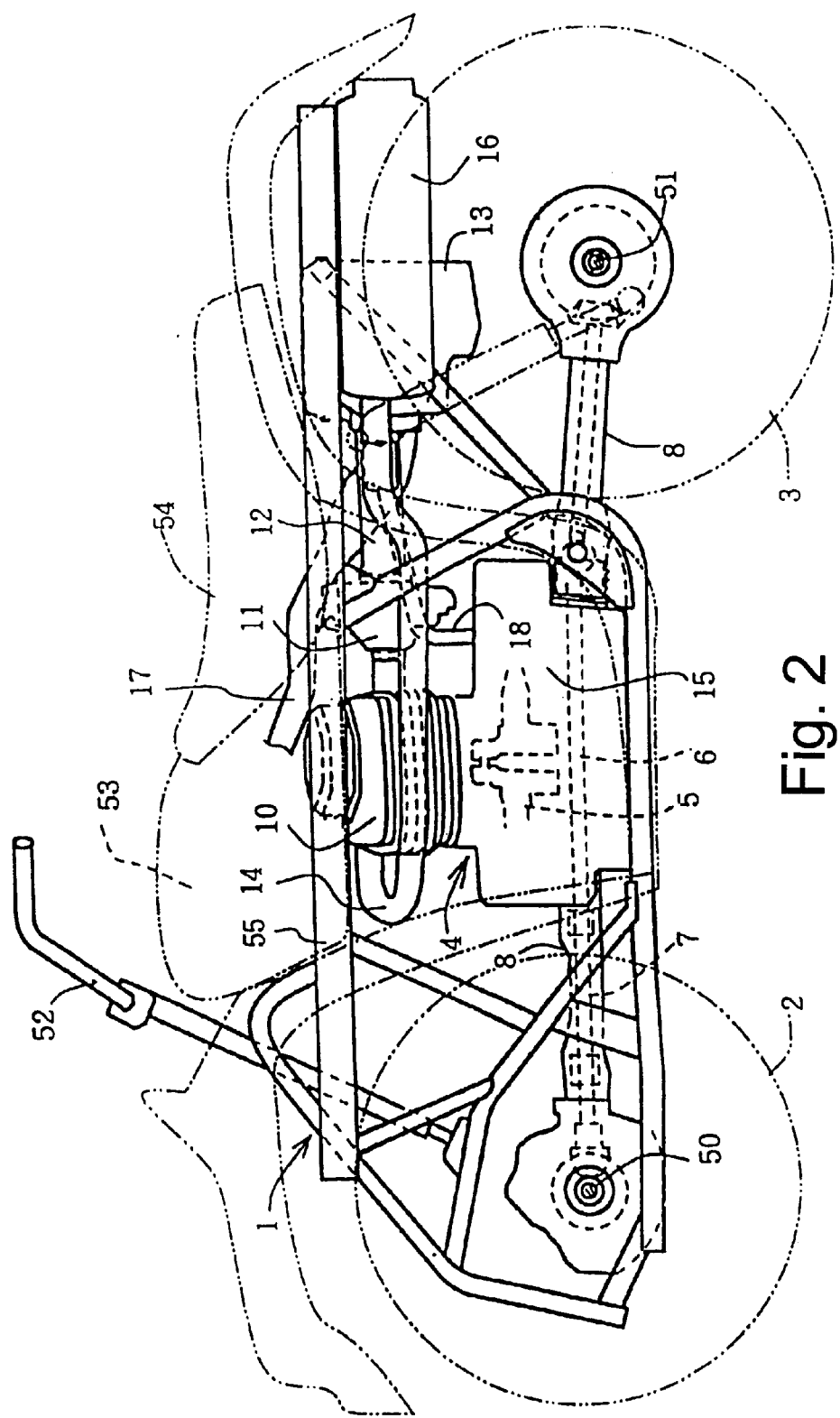
FIG. 2 is a side elevation view of vehicle components of a 4-wheel drive buggy incorporating the present invention.
Figure 3:
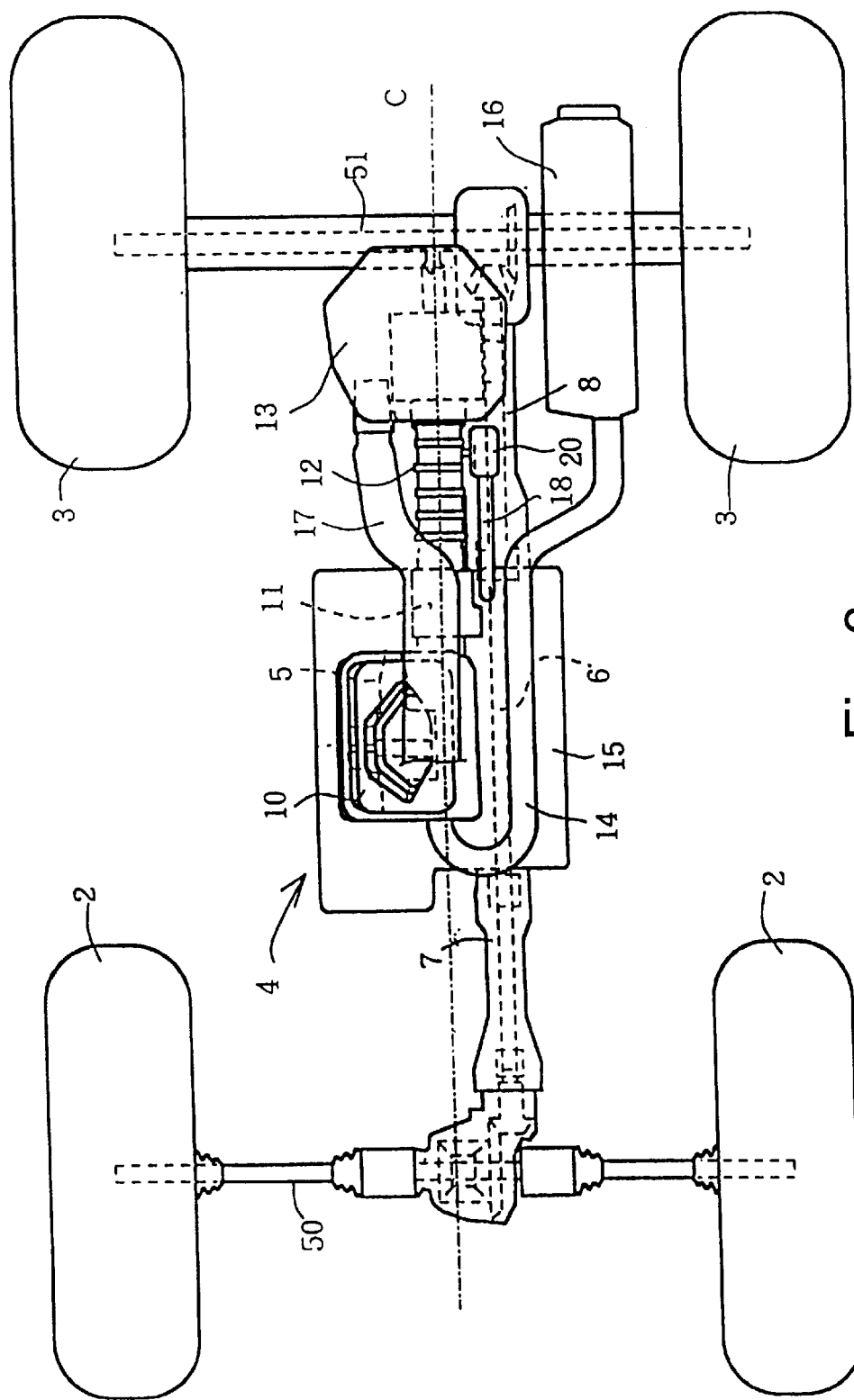
FIG. 3 is a plan view schematically showing the 4-wheel drive buggy of FIG. 2.

FIG. 2 is a side elevation of vehicle body components of a 4-wheeled drive buggy, and FIG. 3 is a plan view schematically showing main parts of the 4-wheeled drive buggy. As shown in these drawings, this 4-wheel buggy is a saddle type 4-wheeled drive vehicle for off-road use. The 4-wheel buggy is provided with a pair of front wheels 2 and a pair of rear wheels 3, respectively in a longitudinal direction of the vehicle, and an engine 4 is provided in the middle of the vehicle.

A crankshaft 5 of an engine 4 is arranged facing in the longitudinal direction of the vehicle, an output shaft 6 for transmitting drive power via a transmission, not shown in the drawings, is also parallel to the direction on which the crankshaft 5 is arranged. The output shaft 6 is respectively connected to a front wheel propeller shaft 7 and a rear wheel propeller shaft 8, and the front wheels 2 and the rear wheels 3 are respectively driven via the front wheel propeller shaft 7 and the rear wheel propeller shaft 8. In FIG. 2, a front wheel axle 50, a rear wheel axle 51, a handlebar 52, a fuel tank 53, a seat 54, and a pair of left and right upper frames 55 are provided in the longitudinal direction of the vehicle.

A cylinder section 10 is tilted to one side of the vehicle (in this embodiment, to the right side of the vehicle) and a carburetor 11 is connected to an intake port on a rear part of the cylinder section 10. The carburetor 11 is connected to an air cleaner 13 through a connecting tube 12 corresponding to the intake passageway of the present invention. An exhaust pipe 14 connected to an exhaust port at a front part of the cylinder section 10 extends in a forward direction from the cylinder section 10, then curves rearwardly, runs through a side of the cylinder section 10 (the left side of the vehicle) and above a crankcase 15, and continues to extend rearwardly until a rear end section connects to a muffler 16.

An intake pipe 17 of the air cleaner 13 extends diagonally upwards and forwards. A front end section is positioned further above the left side crankcase 15 than the cylinder section 10, and a blow-by gas introduction pipe 18 is arranged from a rear section of the crankcase 15 between a front of the air cleaner 13 and a left side surface of the connecting tube 12.

The introduction pipe 18 is a guide passage member for leading blow-by gas occurring inside the crankcase 15 to a catch tank 20. Blow-by gas includes a liquid component of oil or the like that infiltrates non-combusted gas that escape the combustion chamber. The catch tank 20 is a member that utilizes expansion of blow-by gas flowing in from the introduction pipe 18 for gas-liquid separation.

A blow-by gas extraction port of the crankcase 15 is connected to one end of the introduction pipe 18 and is positioned more to the left side of the vehicle as defined by a vehicle center line C (FIG. 2). The catch tank 20 is also positioned to the left side of the vehicle, so that it is arranged on the same side of the vehicle with respect to the connecting tube 12 with which it communicates.

Figure 1:
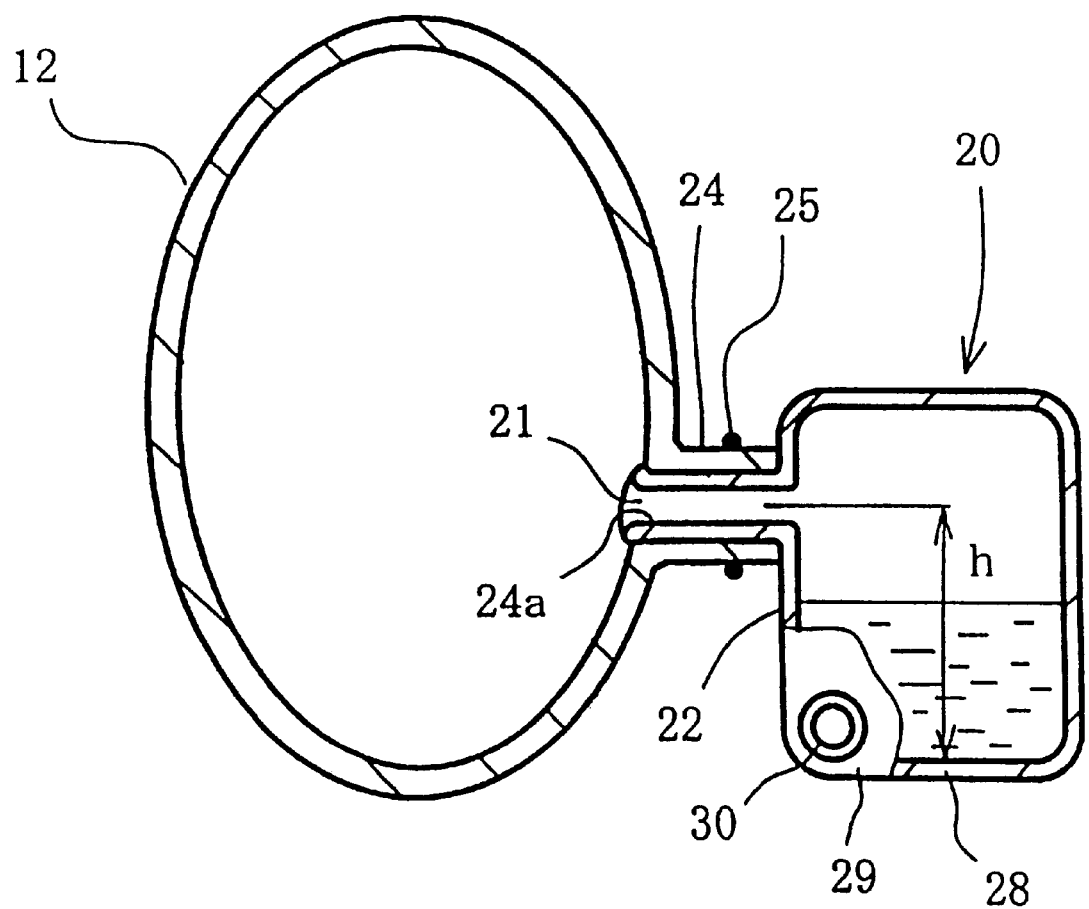
FIG. 1 is a cross sectional view taken along line 1—1 in FIG. 4.
Figure 4:
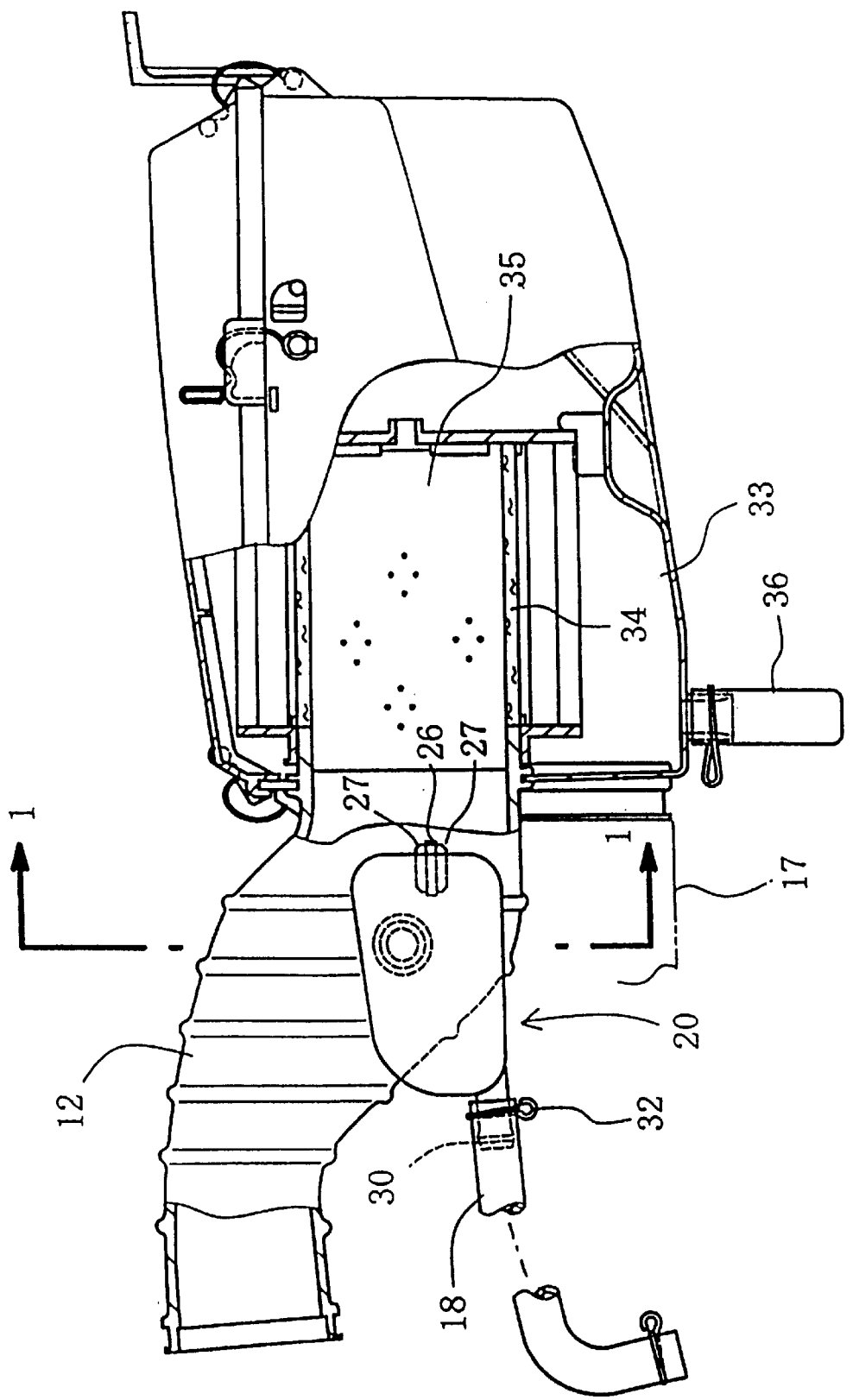
FIG. 4 is a side elevation view showing a crankcase emission control system of the present invention.
Figure 5:
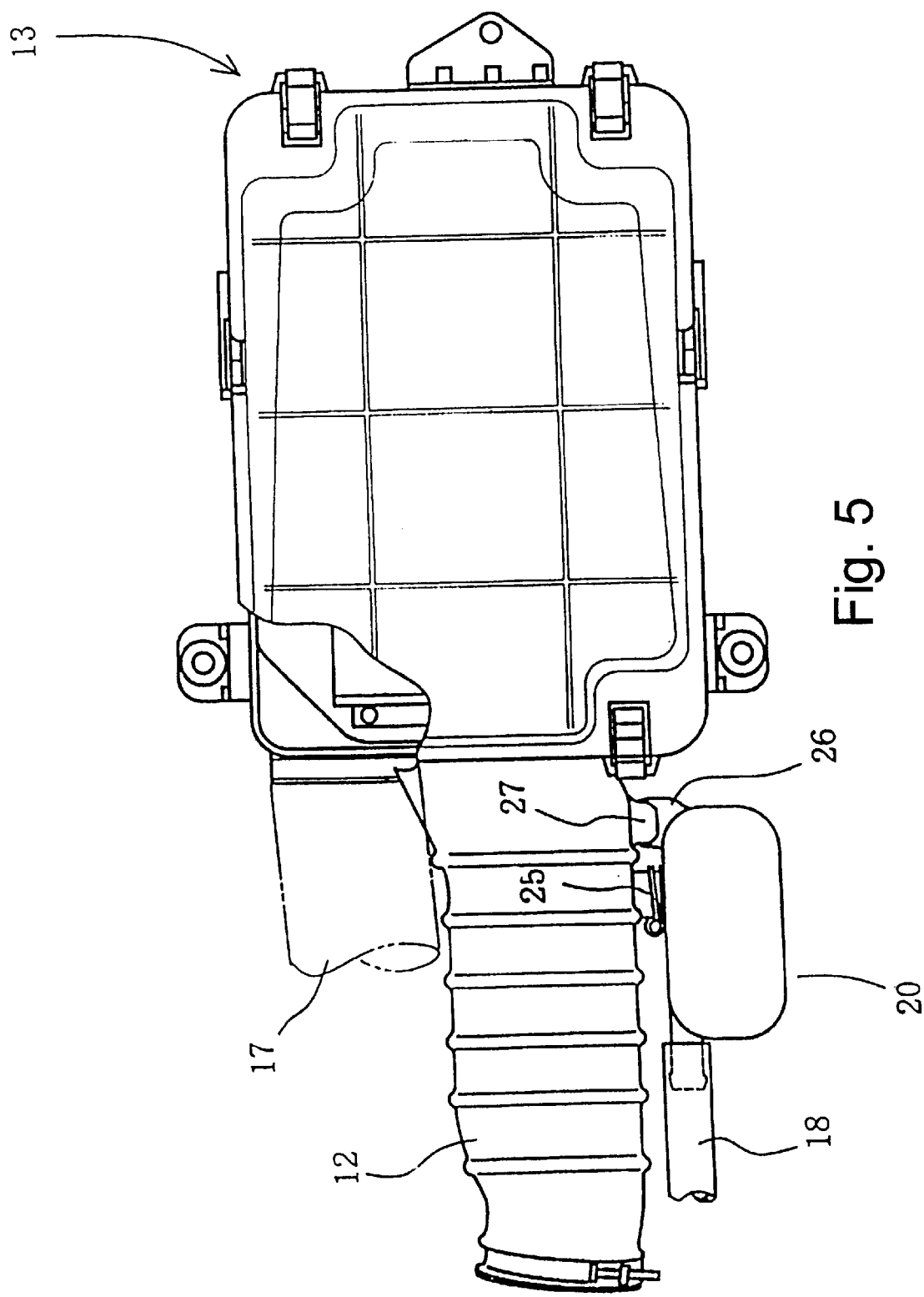
FIG. 5 is a plan view of a crankcase emission control system of the present invention.
Figure 6:
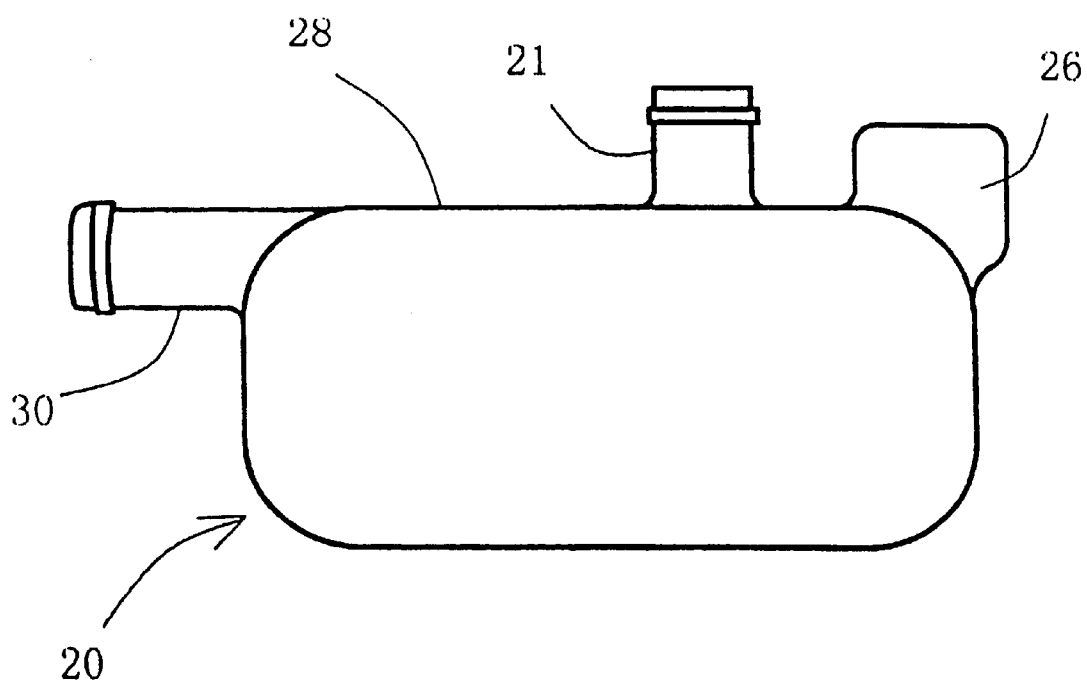
FIG. 6 is a side elevation view of a catch tank of the present invention.
Figure 7:
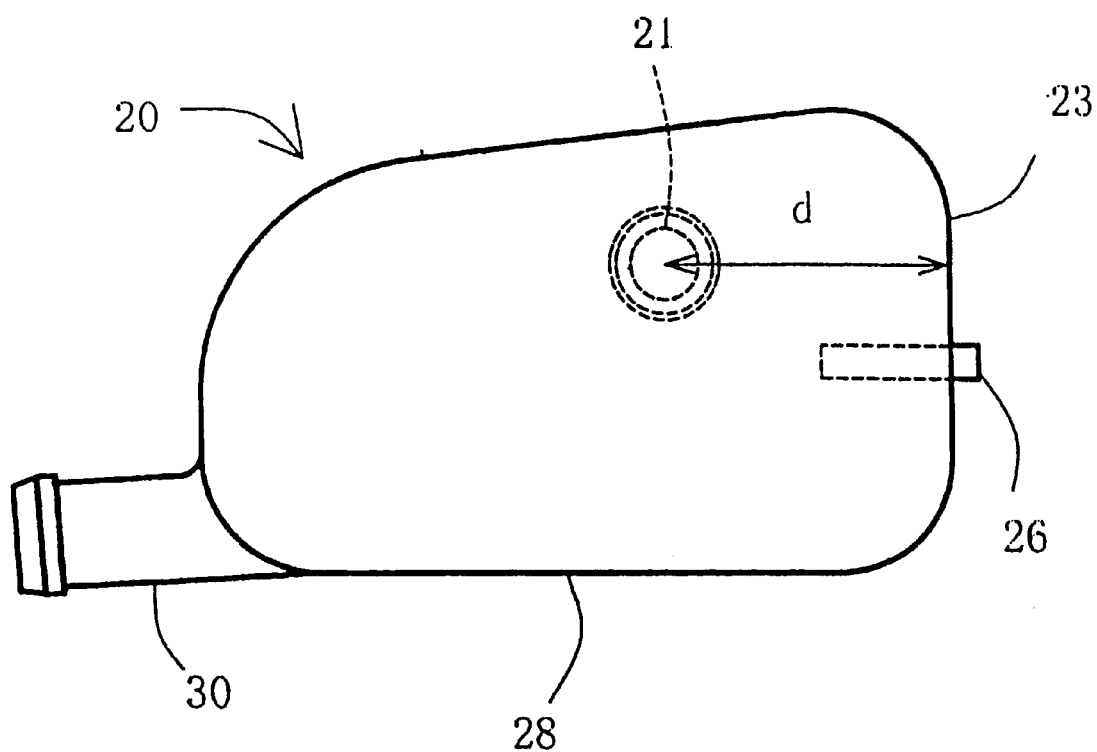
FIG. 7 is a side elevation view of a catch tank of the present invention.
Figure 8:
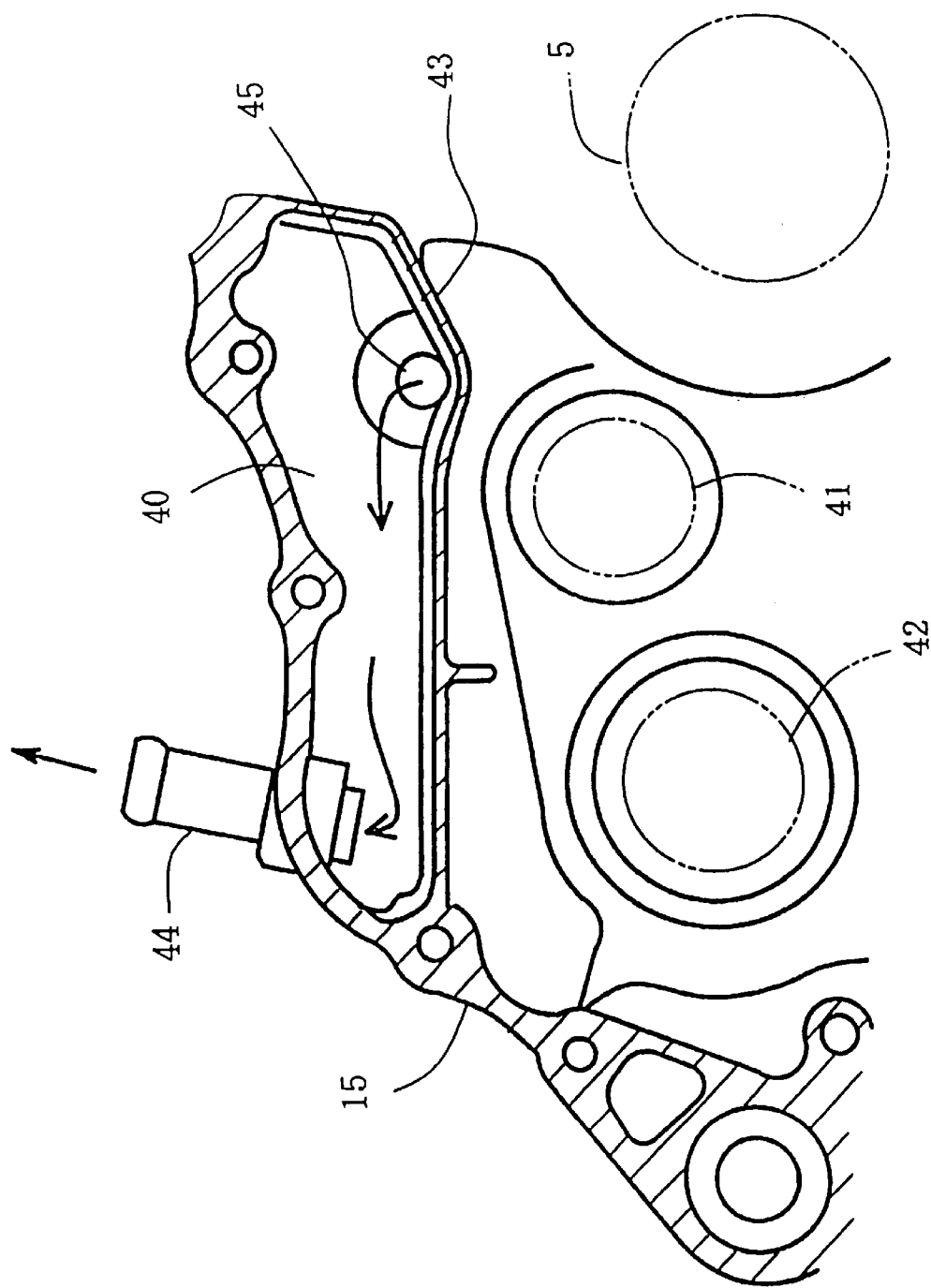
FIG. 8 is a partial cross sectional view showing the structure of a breather chamber.
Figure 9:
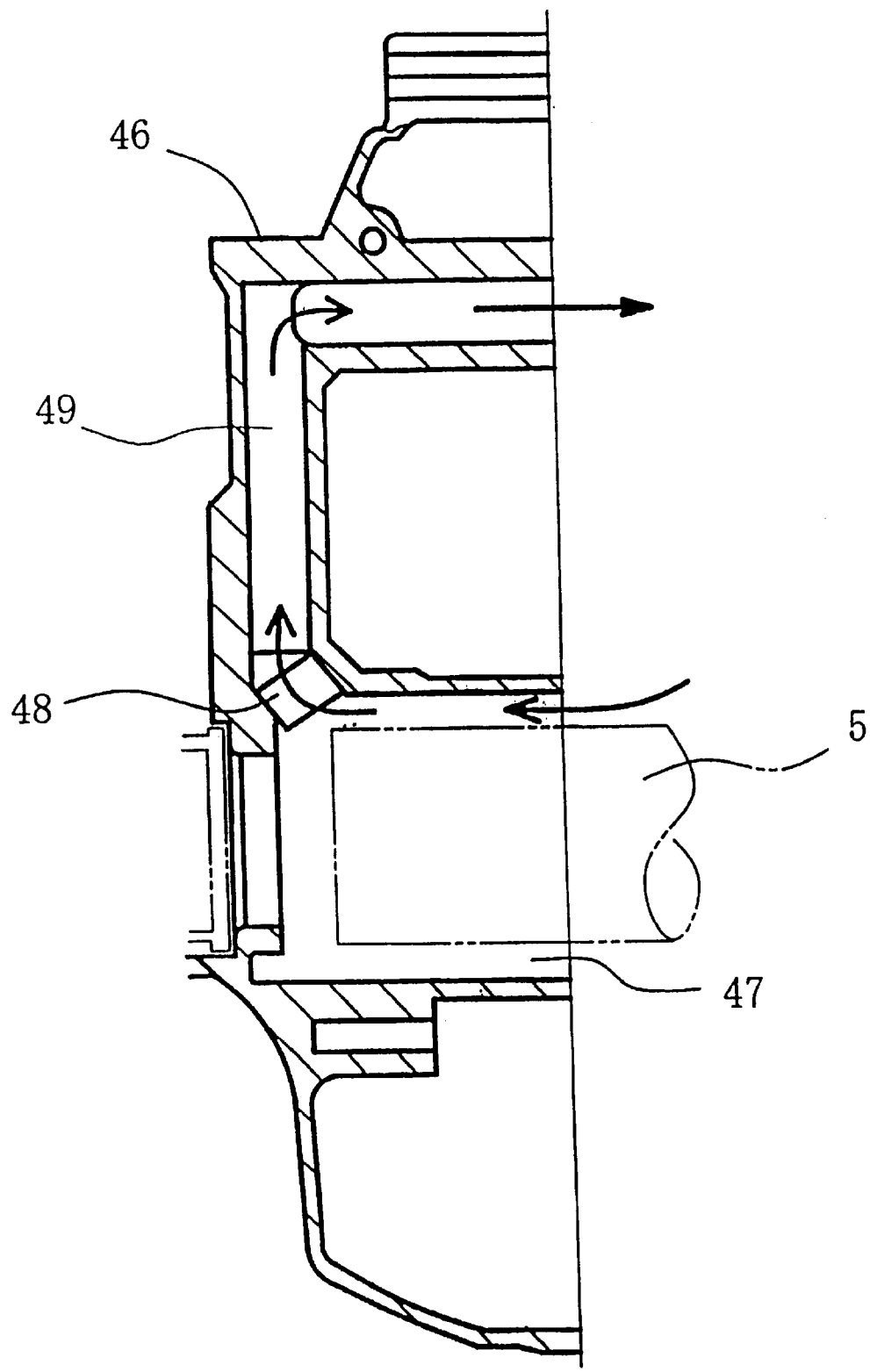
FIG. 9 is a cross sectional view of an ACG cover showing a communicating passage for the breather chamber.
Figure 10:
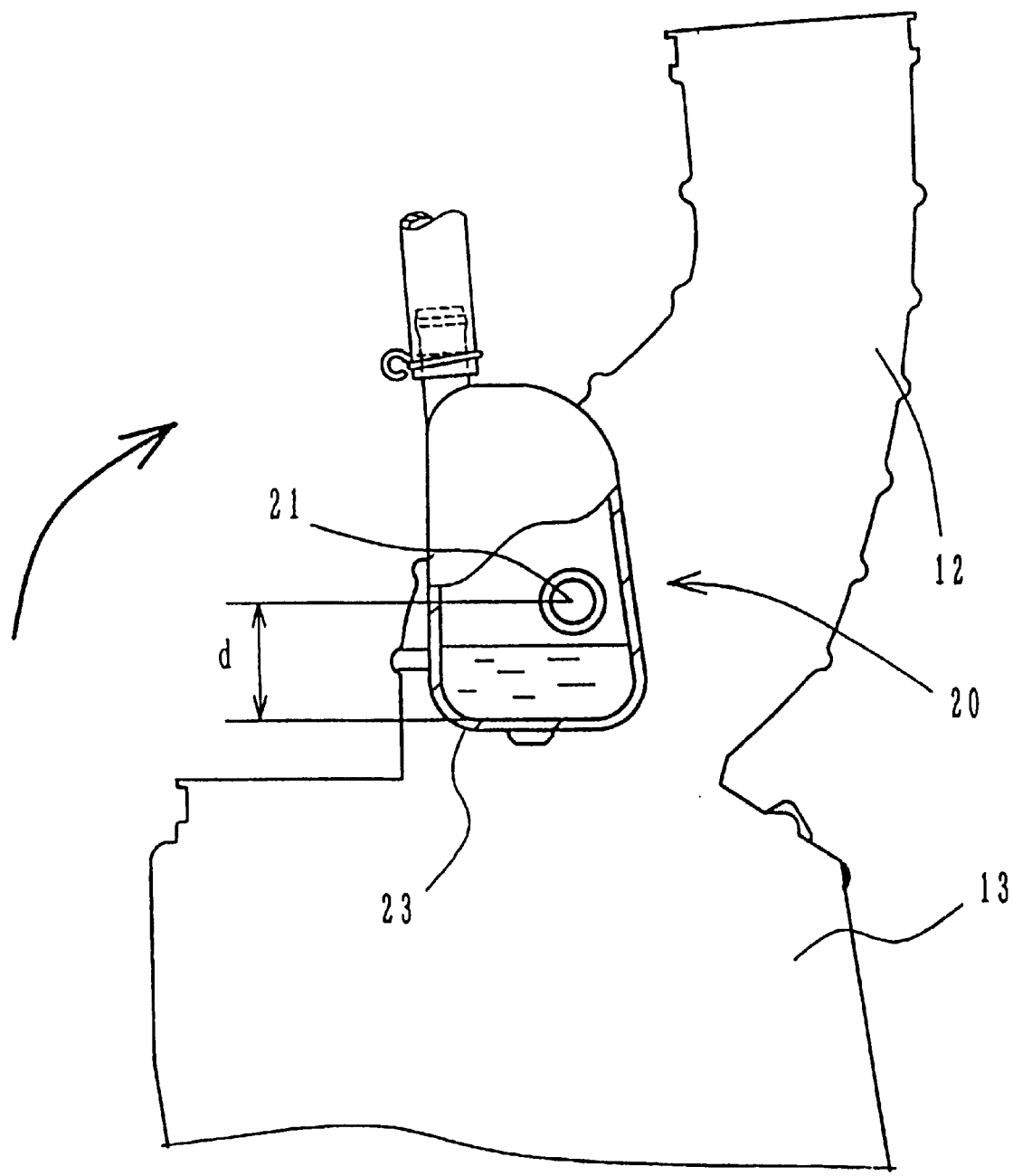
FIG. 10 is a cross sectional view taken along line 1—1 in FIG. 4 showing system operation when a vehicle is operated in an upright position.
Figure 11:
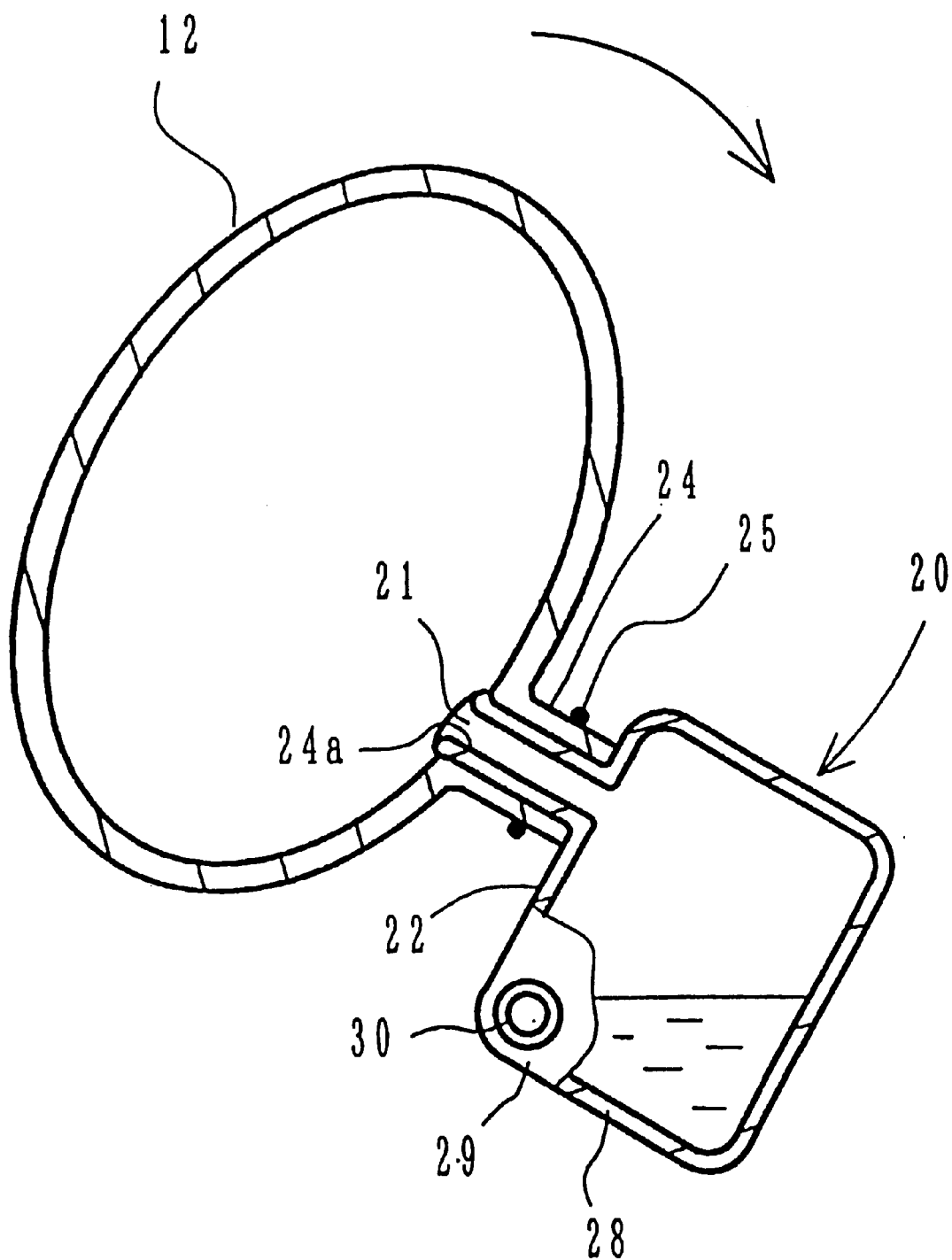
FIG. 11 is a cross sectional view taken along line 1—1 in FIG. 4 showing system response when a vehicle is operated when it is tilted in a leftward direction.

Next, a crankcase emission control structure will be described. FIG. 1 is a cross sectional view taken along line 1—1 in FIG. 4. FIG. 4 is a side elevation showing a crankcase emission control system of the present invention, FIG. 5 is a plan view of a crankcase emission control system of the present invention, FIG. 6 is a side elevation view of a catch tank, FIG. 7 is a side elevation view of a catch tank, FIG. 8 is a partial cross sectional view showing the structure of a breather chamber. FIG. 9 is a cross sectional view of an ACG cover showing a communicating passage for the breather chamber, FIG. 10 is a cross sectional view taken along line 1—1 in FIG. 4 showing system operation when a vehicle is operated in an upright position, and FIG. 11 is a cross sectional view taken along line 1—1 in FIG. 4 showing system response when a vehicle is operated when it is tilted in a leftward direction.

As shown in these drawings, the catch tank 20 is a hollow tank made using a resin or other suitable material. The catch tank 20 is attached at its right side surface to a connecting tube 12 that is connected to an air cleaner 13. The catch tank directly communicates with the inside of the connecting tube 12 via a joint pipe 21 projecting integrally from a right side surface of the catch tank 20.

Specifically, the joint pipe 21 constitutes the connecting passage of this invention, and with respect to the side surfaces of the catch tank 20, is positioned offset in a vertical direction at the right side surface 22. The right side surface is a side facing the inside of the vehicle and the connecting tube 12 and the joint pipe 21 is offset above and to the rear from a central section in the longitudinal direction, and is provided at a front position defined by a dimension h above a bottom section 28, and a dimension d from a rear wall 23 (FIG. 7).

This joint pipe 21 is inserted into a tube section 24 projecting to a side of the catch tank 20 from a left side surface of the connecting tube 12. An end section of the joint pipe 21 is inserted into an opening 24a of the connecting tube 12 surrounding the tube section 24, and the periphery of the tube section 24 is integrally connected by fastening using clips 25.

Also, a projection 26, integrally formed on an end section of the right side surface 22 so as to project to the connecting tube 12 side, is positioned by inserting between a pair of projecting sections 27 formed maintaining a space vertically to the left surface of the connecting tube 12.

Further, the introduction pipe 30 is integrally formed at a corner section 29 formed between a right side surface 22 of the catch tank 20 and a bottom section 28 sloping slightly forward and downward. The introduction pipe 30 projects slightly forwards and slopes downwards along the prolonged line of the bottom section 28, and one end of the introduction tube 18 is connected here and fixed with clips 32 (FIG. 7).

The introduction pipe 30 is provided at a position defining the lowest part of the catch tank 20. There is a difference of elevation substantially equivalent to the dimension h between the introduction pipe 30 and the joint pipe 21 (FIG. 1). The bottom section 28 is formed sloping slightly forwards, which means that the introduction pipe 30 is provided at the lowest part of the catch tank 20.

The dimensions h and d are respectively suitably set based on an assumed reduction amount of a liquid component of the blow-by gas. It is also possible to regulate the reduction amount by adjusting the opening diameter of the introduction pipe 30.

FIG. 4 and FIG. 5 show a dirty air chamber 33, an air filter 34, a clean air chamber 35, and a drain pipe 36. External air introduced from the intake tube 17 to the dirty air chamber 33 is filtered by the air filter 34 to become clean air, which is then supplied from the clean air chamber 35, through the connecting tube 12 to the carburetor 11.

FIG. 8 shows the structure of a breather chamber 40 connected to one end of the introduction tube 18. The breather chamber 40 is formed separated from a transmission of a crankshaft 5, a main shaft 41, and a counter shaft 42 etc. by a bulkhead 43 at an inner upper part of the crankcase 15. A joint pipe 44 corresponding to the blow-by gas extraction port of the present invention is provided at the upper section, and one end of the introduction tube 18 is connected to this port. Also, the communicating passageway 45 is provided at a position diagonally across from the position of the joint pipe inside the breather chamber 40, and at an extremely low position.

FIG. 9 shows part of an ACG cover 46 attached from a vehicle rear side of a rear side surface of the crankcase 15. A communicating opening 48 is diagonally formed in an upper corner part of a shaft hole 47 for housing one end of the crankshaft 5. Blow-by gas inside the crankcase 15 flows from the shaft hole 47 to a curved communicating passage 49. The curved communication passage 49 runs along a side surface wall of the ACG 46 and extends upwards, curves substantially horizontally at a ceiling section, faces to the inside of the crankcase 15, and communicates with the communicating passage 45 of the breather chamber 40.

Accordingly, blow-by gas enters into the breather chamber from the communicating passage 45 after passing from the inside of the crankcase 15 through the shaft hole 47, communicating opening 48 and through the curved communicating passage 49. The blow-by gas then passes through the joint pipe 44 through the introduction tube 18 to the catch tank 20, where the blow-by gas is expanded in the catch tank to effect gas-liquid separation. Liquid components of the blow-by gas accumulate on the bottom section 28 of the catch tank 20.

The accumulated liquid is then returned from the introduction pipe 30 through the introduction tube 18 to the breather chamber 40. The gas component enters directly into the inside of the connecting tube 12 from the joint pipe 21, and is then reduced to the carburetor 11 together with clean air from the air cleaner 13.

As shown in FIG. 1, FIG. 3 and FIG. 4, the introduction pipe 30 is provided close to the bottom part 28 of the catch tank 20, and the joint pipe 21 is provided at an upper part of the right side surface 22 of the catch tank. This configuration produces a system whereby it is difficult for a liquid component of the blow-by gas, even if the catch tank 20 is directly attached to the side surface of the connecting tube 12, to leak to the inside of the connecting tube 12. Also, the liquid component of the blow-by gas that has accumulated in the bottom section 28 is rapidly returned to the breather chamber 40 because the bottom section 28 slopes forward and downward.

Accordingly, it becomes possible to directly attach the catch tank 20 to a side surface of the connecting tube, and as a result there is no need for attachment members such as a vehicle side stay, band or bolt that were required for attachment to the air cleaner 13 side in the related art. Therefore, the number of components in the present invention can be reduced and the attachment structure can be simplified.

When this type of 4-wheeled buggy is stored, the connecting tube 12 and the catch tube 20 are turned about 90° upwards, as shown in FIG. 10, but the joint pipe 21 is positioned further forward than the rear wall 23 by the dimension d. This positioning results in a liquid surface that does not reach the joint pipe 21, thus preventing leakage of fluid when the vehicle is being stored. Consequently, it is possible to safeguard the effectiveness of the gas-liquid separation chamber.

As shown in FIG. 11, if the vehicle leans to the left while being used in an off-road environment, oil etc. flows into the breather chamber 40 provided at the left end side of the crankcase 15. Normally there is a possibility that a large amount of oil will leak inside the catch tank 40 through the introduction tube 18 from the joint pipe 44 at the blow-by gas extraction port.

However, in the case of the present invention the liquid surface is sloped relative to the bottom section 28, and a side where the liquid surface becomes high becomes the left side surface where the joint pipe 21 is not provided. Therefore, the joint pipe 21 is positioned above the liquid surface and it is still possible to prevent fluid leakage from the joint pipe 21.

Conversely, if the vehicle leans to the right, there is a possibility that the joint pipe 21 will be below the catch tank 20. However, in this case there is hardly any leakage of oil etc. to the breather chamber 40, so there is very little possibility of liquid such as oil etc. flowing out from the catch tank 20 to the connecting tube 12. Further, in this embodiment, since the introduction tube 30 is provided on a right side corner section 29 close to the right side surface 22 providing the joint pipe 21, a liquid component remaining in the catch tank 20 is more easily evacuated to the breather chamber 40 than to the joint pipe 21.

However, the prevention of fluid leakage that has been described up to now is effective when the breather chamber 40 is provided on the left side of the crankcase 15, the catch tank 20 is attached to the left side of the connecting tube 20, and when the breather chamber 40 is provided on the right side of the crankcase 15. In this arrangement it is possible to prevent fluid leakage to the joint pipe 21 by also providing the catch tank 20 on the right side of the connecting tube 12.

In this embodiment, by directly attaching the catch tank 20 having sufficient capacity to function as an expansion chamber to the connecting tube 12, the catch tank 20 acts as a resonator, which means that it is also possible to cause a reduction in intake noise.

The present invention is not limited to the above-described embodiments, and it is to be understood that various changes in design may be made without departing from the scope of the present invention. For example, the crankcase emission control system is not limited to a 4-wheeled buggy. It is possible that liquid movement inside a catch tank 20 of a motorcycle such as an off-road bike will become severe when rising over bumps and crevices etc., so that the present crankcase emission control system would prove to be effective.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A crankcase emission control system for a vehicle comprising:
   a blow-by gas extraction port for a crankcase;
   a connecting tube for connecting a carburetor and an air cleaner;

a communicating opening connecting a shaft hole surrounding said crankcase with a curved communicating passage;

a horizontal communicating passage for a breather chamber, wherein said curved communicating passage is connected to said horizontal communicating passage in order to deliver crankcase blow-by gas to the breather chamber;

a breather chamber joint pipe connected through an introduction tube;

a catch tank, the introduction tube provided for leading blow-by gas occurring inside the crankcase to the catch tank and the catch tank has at least an inside surface, an outside surface, a right side surface, a left side surface, a top surface, a bottom surface, a front side surface, and a rear side surface, wherein blow-by gas is expanded in the catch tank to effect gas-liquid separation and liquid accumulates along the inside and bottom surfaces of the tank;

an introduction pipe formed at a corner portion of the catch tank where the bottom surface, front side surface, and either of the right and the left side surfaces meet, wherein the introduction pipe is connected to said introduction tube;

a catch tank joint pipe for connecting the catch tank to the connecting tube, wherein the joint pipe is positioned along either the right or the left side surface of said catch tank for providing liquid-free communication of gases to the connecting tube.

2. The system according to claim 1, wherein the catch tank joint pipe is provided at a position above the introduction pipe and defined by an elevation dimension h.

3. The system according to claim 1, wherein the catch tank joint pipe is provided at a position in front of the rear side surface of said tank that is defined by a distance dimension d.

4. The system according to claim 3, wherein the catch tank joint pipe is provided at a position in front of the rear side surface of said tank that is defined by a distance dimension d, wherein h and d are arranged to prevent a liquid component flowing from the catch tank joint pipe to the connecting tube during operation in upright and tilted positions.

5. The system according to claim 1, wherein the catch tank includes a projection integrally formed on an end section of either the right or left side surface and projecting toward the connecting tube.

6. The system according to claim 5, wherein the projection is inserted between a pair of projecting sections formed on either a left or a right surface of the connecting tube.

7. The system according to claim 1, wherein the catch tank joint pipe is inserted into a tube section 24 projecting toward either the right or the left side surface of the catch tank.

8. The system according to claim 7, wherein an end section of the catch tank joint pipe is inserted into an opening of the connecting tube surrounding the tube section, and the periphery of the tube section is integrally connected by fastening clips.

9. The system according to claim 1, wherein the bottom surface of the tank projects slightly forward and downward in order to form a lowest portion of the tank at the corner portion of the catch tank.

10. The system according to claim 9, wherein the introduction pipe projects slightly forward and downward from the lowest portion of the tank to promote draining of liquid from the bottom portion of the catch tank.

11. The system according to claim 10, wherein the introduction pipe opens at a position within the catch tank that is separated from a lower surface and a rear surface of the gas-liquid separation chamber.

12. The system according to claim 1, wherein the blow-by gas extraction port provided is arranged offset from an engine center line extending in a longitudinal direction of the vehicle.

13. The system according to claim 12, wherein the catch tank is arranged with respect to the connecting tube on the same side of the vehicle to which the blow-by gas extraction port is offset.

14. A crankcase emission control system for a vehicle comprising:

a carburetor;

an air cleaner a connecting tube; and a catch tank, wherein the catch tank has at least an inside surface, an outside surface, a right side surface, a left side surface, a top surface, a bottom surface, a front side surface, and a rear side surface, wherein blow-by gas is expanded in the catch tank to effect gas-liquid separation;

an introduction pipe formed at a corner portion of the catch tank where the bottom surface, front side surface, and right side surfaces of the catch tank adjoin; and a catch tank joint pipe formed along either the right or left side surface of the catch tank for connecting the catch tank to the connecting tube, wherein the catch tank joint pipe is positioned for providing liquid-free communication of gases to the connecting tube.

15. The system according to claim 14, wherein the catch tank joint pipe is provided at a position above the introduction pipe and defined by an elevation dimension h.

16. The system according to claim 15, wherein the catch tank joint pipe is provided at a position in front of the rear side surface of said tank that is defined by a distance dimension d.

* * * * *